United States Patent [19]

Seemann

[11] 3,882,143
[45] May 6, 1975

[54] 4-(2-HYDROXY-3-AMINOPROPOXY)OXINDOLE DERIVATIVES

[75] Inventor: Fritz Seemann, Basel, Switzerland

[73] Assignee: Sandoz Ltd., Basel, Switzerland

[22] Filed: Dec. 19, 1972

[21] Appl. No.: 316,580

[52] U.S. Cl.......... 260/325 R; 424/274; 260/240 D; 260/295 B
[51] Int. Cl............................................. C07d 27/40
[58] Field of Search............ 260/325, 240 D, 295 B

[56] References Cited
UNITED STATES PATENTS
3,696,121  10/1972  Troxler.......................... 260/326.15

Primary Examiner—Joseph A. Narcavage
Attorney, Agent, or Firm—Gerald D. Sharkin; Robert S. Honor; Thomas O. McGovern

[57] ABSTRACT

The present invention concerns substituted oxindoles of the formula:

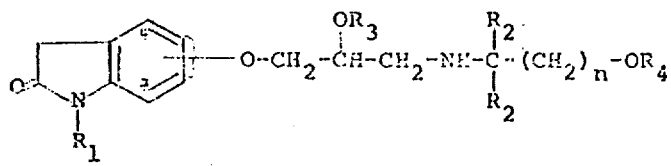

wherein
R$_1$ is hydrogen or alkyl, both groups
R$_2$ are the same and are each hydrogen or alkyl,
n is an integer from 1 to 8, and
R$_3$ and R$_4$, which are the same or different, are each hydrogen or a carbonyl containing group
useful, inter alia, in the treatment of Angina pectoris and heart rhythm disorders.

9 Claims, No Drawings

4-(2-HYDROXY-3-AMINOPROPOXY)OXINDOLE DERIVATIVES

The present invention relates to new heterocyclic compounds and more specifically to substituted oxindoles.

In accordance with the invention there are provided new compounds of formula I,

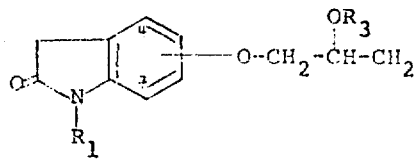

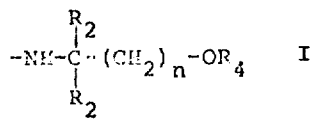

wherein the aminopropoxy side chain is in the 4 or 7 position of the oxindole structure, $R_1$ is hydrogen or alkyl of 1 to 4 carbon atoms, both groups $R_2$ are the same and are each hydrogen or alkyl of 1 to 4 carbon atoms, $n$ is an integer from 1 to 8, and $R_3$ and $R_4$, which are the same or different, are each hydrogen or the group —$COR_5$, wherein $R_5$ is alkyl of 1 to 12 carbon atoms; cycloalkyl of 3 to 6 carbon atoms; cycloalkyl of 3 to 6 carbon atoms substituted by alkyl of 1 to 4 carbon atoms; a 5- or 6-membered heterocycle having a hetero atom selected from oxygen, nitrogen or sulphur; phenyl; phenylalkyl of 7 to 12 carbon atoms; styryl; or phenyl, phenylalkyl of 7 to 12 carbon atoms or styryl substituted, on the phenyl nucleus thereof, by fluorine, chlorine, bromine, alkyl of 1 to 4 carbon atoms or alkoxy of 1 to 4 carbon atoms.

When $R_1$ is alkyl, this is preferably methyl.

The preferred compounds are those wherein $R_1$ is hydrogen.

When each $R_2$ is alkyl, this preferably contains 1 to 2 carbon atoms and more preferably is methyl.

The symbol $n$ is preferably an integer from 1 to 3, more preferably 1.

When the radical $R_5$ is branched alkyl, this is preferably symmetrically branched at the $\alpha$ carbon atom. In addition, when $R_5$ is alkyl, this preferably contains 3 to 10 carbon atoms. Examples are tert.butyl, n-nonyl and n-hexyl. The preferred alkyl radicals are those branched at the $\alpha$ carbon atom and containing 3 to 6 carbon atoms, e.g., isopropyl, tert.butyl or 1,1-dimethylpropyl. The tert.butyl group is specially preferred.

When $R_5$ is alkyl substituted cycloalkyl, the alkyl substituent is preferably methyl. The preferred alkyl substituted cycloalkyl is monoalkylated cycloalkyl, especially monomethylated in the 1 position. A typical representative of this series is 1-methylcyclohexyl.

When $R_5$ is a 5- or 6-membered heterocycle, this may be, for example, thienyl, furyl, pyridyl or tetrahydropyranyl.

When $R_5$ is phenylalkyl, this preferably contains up to 10 carbon atoms. An example of this group is the benzyl group.

When $R_5$ is alkyl or alkoxy substituted phenyl, phenylalkyl or styryl, these are preferably methyl or methoxy substituted.

The preferred compounds of formula I are those substituted in the 4 position of the oxindole structure by the aminopropoxy side chain.

Further, in accordance with the invention, a compound of formula I may be obtained by a process comprising a. reacting a compound of formula II,

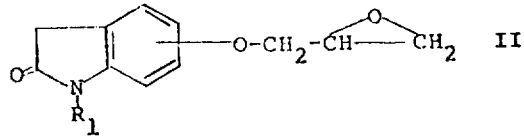

wherein the epoxypropoxy side chain is in the 4 or 7 position of the oxindole structure, and
$R_1$ is as defined above,
with a compound of formula III,

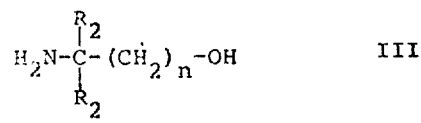

wherein $n$ and $R_2$ are as defined above, to obtain a compound of formula Ia,

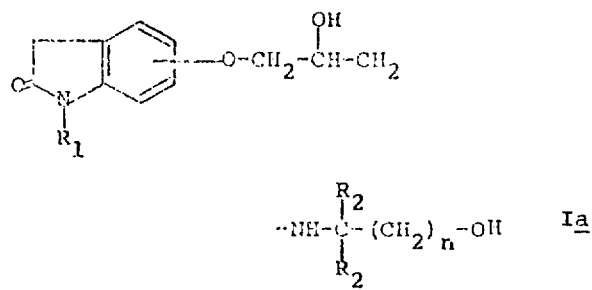

wherein the aminopropoxy side chain is in the 4 or 7 position of the oxindole structure, and
$R_1$, $R_2$ and $n$ are as defined above, b. reducing a compound of formula IV,

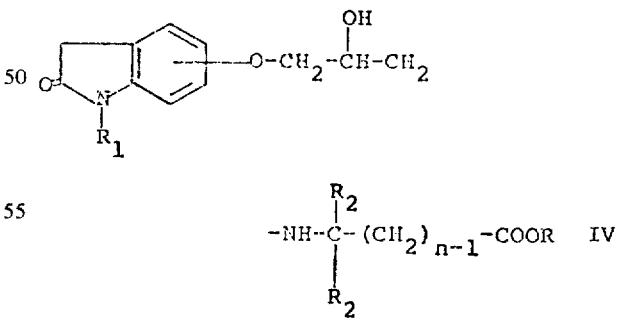

wherein the aminopropoxy side chain is in the 4 or 7 position of the oxindole structure,
$R_1$, $R_2$ and $n$ are as defined above,
and R is alkyl, preferably of 1 to 4 carbon atoms, e.g. 1 or 2 carbons, to obtain a compound of formula Ia, or c. converting a compound of formula Ia into a compound of formula Ib,

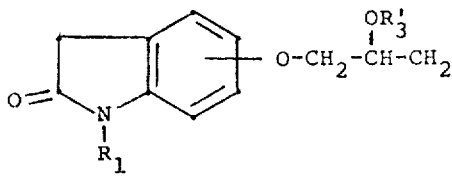

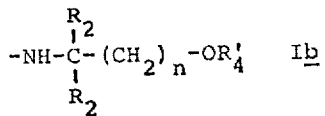

wherein the aminopropoxy side chain is in the 4 or 7 position of the oxindole structure, one of $R'_3$ and $R'_4$ is —$COR_5$, wherein $R_5$ is as defined above, and the other is hydrogen, or both $R'_3$ and $R'_4$ are —$COR_5$, wherein $R_5$ is as defined above, by mono- or diacylation.

The compounds of formula I may exist either in free base or acid addition salt forms. Acid addition salt forms may be produced in known manner from the free base forms and vice versa.

The reaction in accordance with the invention, of a compound of formula II with a compound of formula III, may be effected in accordance with known methods. For example, the reaction may be effected in an inert organic solvent, e.g., in an aromatic hydrocarbon such as benzene, toluene or xylene, in an ether such as dioxane or tetrahydrofuran, or in amyl alcohol.

The reaction temperature may range e.g., between about 20° and 150°C; the reaction is preferably effected at the boiling temperature of the reaction mixture at reflux. The reaction time depends on the reaction temperature.

The acylation of a compound of formula Ia may be effected in accordance with known methods, e.g., by reaction with a halide or anhydride of an acid $R_5COOH$, wherein $R_5$ is as defined above. Either predominantly monoesters or diesters of compounds of formula Ia (hereinafter named mono- or diesters) are obtained depending on the amount of acylating agent used.

The monoesters may be produced by treating the compounds of formula Ia with about 1 mol of an acylating agent and conveniently effecting the reaction under mild conditions, preferably at room temperature. A mixture of compounds of formula Ia which are esterified on the primary (terminal) alcohol group, with compounds which are esterified on the secondary alcohol group of the aminopropoxy radical, as well as diesters, is obtained. The separation of these compounds may be effected in accordance with known methods, e.g., chromatographically.

The diesters may be produced by treating the compounds of formula Ia, conveniently with an excess of about 2 to 5 mols or more of an acylating agent, preferably at room temperature.

For example, this may be effected by adding an excess of an acid $R_5COOH$ to a compound of formula Ia and adding, in excess if necessary, the corresponding anhydride to the resulting reaction mixture, depending on the desired final compounds.

If desired, the reaction may be effected in an inert organic solvent, e.g., hexametapol, a chlorinated aliphatic hydrocarbon such as chloroform or a cyclic or open chain ether such as dioxane.

The reaction temperature may range between room temperature and about 100°C; room temperature is preferably used, as mentioned above, for the production of the monoester.

After stirring, e.g., for several hours, the reaction mixture may be worked up, e.g., by pouring the same on ice, making it alkaline with lye or ammonia and extracting with a water-immiscible inert organic solvent, e.g., ethyl acetate, a cyclic or open chain ether, such as diethyl ether, or a chlorinated aliphatic hydrocarbon, such as methylene chloride.

The working up stage should naturally be effected under mild conditions, since otherwise the ester groups may be split.

The addition of $R_5COOH$ may be omitted when the compounds of formula Ia are used in the form of an acid addition salt with a suitable mineral acid, e.g., hydrochloric acid. The danger of an N-acylation is eliminated by the protonization of the amino group of the aminopropoxy side chain; however, protonization is not essential, especially when $R_2$ is alkyl. When the reaction is effected in the presence, e.g., of hydrogen chloride, the mono- or diesters crystallize as hydrochloride and it is not necessary to work up the reaction mixture.

The acylation may naturally likewise be effected with acid halides. In this case the reaction is preferably effected at room temperature or at a slightly elevated temperature.

The reduction of compounds of formula IV may be effected in accordance with known methods for analogous compounds. Suitable reducing agents are those which permit the selective reduction of an ester group, i.e., without affecting the lactam group contained in the oxindole structure. Examples of suitable reducing agents are complex borohydrides such as lithium borohydride.

The reduction of compounds of formula IV, e.g., with lithium borohydride, may be effected in the usual organic solvents for such reductions, e.g., in an ether such as tetrahydrofuran. The reduction with lithium borohydride is preferably effected at an elevated temperature and in the absence of oxygen.

The production of compounds of formula IV may be effected in a manner analogous to the processes described for the production of compounds of formula Ia, by reaction of aminocarboxylic acid esters with epoxypropoxyoxindoles of formula II.

Compounds of formula II may be obtained by reacting the corresponding hydroxyoxindole with an epihalohydrin, e.g., epichlorhydrin.

Insofar as the production of the required starting materials is not particularly described, these are known or may be produced in accordance with known processes, or in a manner analogous to the processes described herein or to known processes.

The compounds of formula I are useful because they possess pharmacological activity in animals. In particular, the compounds are useful as adrenergic β-blocking agents, e.g., in the prophylaxis and therapy of coronary diseases, particularly in the treatment of Angina pectoris, the hyperkinetic heart syndrome and conditions resulting from muscular hypertrophic subvalvular aortostenosis, and also as antiarrhythmic agents, e.g., in the treatment of heart rhythm disorders, as indicated in standard tests, e.g., by an inhibition of the positive inotropic adrenalin effect in the spontaneously beating guinea pig atrium at a bath concentration of from 0.005 to 3 mg/litre, and a prolonged inhibition of the tachycardia and hypotension caused by isoproterenol [1-

(3,4-dihydroxyphenyl)-2-isopropylaminoethanol] in the infusion test in the anaesthetized dog at an effective cumulative dose, administered intravenously by infusion, of from 0.01 to 1 mg/kg animal body weight.

For the above-mentioned uses, the dosage administered will, of course, vary depending on the compound employed, mode of administration and treatment desired. However, in general, satisfactory results are obtained when administered, e.g. orally or parenterally, at a daily dosage of from about 0.01 to 10 mg/kg animal body weight, which may, if necessary, be administered in divided form twice daily. For the larger mammals, the total daily dosage is in the range of from about 1 to 500 mg, and dosage forms suitable for oral administration comprise from about 0.5 to 250 mg of the compound, admixed with a solid or liquid pharmaceutical carrier or diluent.

The compounds of formula I may be employed in the form of appropriate pharmaceutical compositions including pharmaceutical carriers or diluents. A suitable form of composition for oral administration is a tablet.

Free base and acid addition salt forms of the compounds of formula I exhibit the same type of activity. Examples of pharmaceutically acceptable acid addition salt forms are the hydrochloride, hydrogen oxalate and oxalate forms.

Specific examples of daily doses, at which satisfactory results are obtained, are as follows, viz.

| (i) | 4-[2-Hydroxy-3-(2-hydroxymethyl-2-propyl-amino)propoxy]oxindole | ... 0.01 to 10 mg/kg animal body weight administered i.v.; |
| (ii) | 4-[2-Pivaloyloxy-3-(2-pivaloyloxymethyl-2-propylamino)propoxy]-oxindole | ... 0.01 to 10 mg/kg animal body weight administered i.v.; |
| (iii) | 4-[2-Hydroxy-3-(2-pivaloyloxymethyl-2-propylamino)propoxy]-oxindole | ... 0.01 to 10 mg/kg animal body weight administered i.v.; |
| (iv) | 4-[3-(2-Hydroxymethyl-2-propylamino)-2-pivaloyloxypropoxy]-oxindole | ... 0.01 to 10 mg/kg animal body weight administered i.v. |

Examples of the present invention will now be described in more detail, wherein all temperatures referred to are in degrees Centigrade.

EXAMPLE 1

4-[2-Hydroxy-3-(2-hydroxymethyl-2-propylamino)-propoxy]oxindole (process b))

A solution of 1.5 g of 2-methyl-2-[2-hydroxy-3-(4-oxindolyloxy)propylamino]propionic acid ethyl ester in 100 cc of absolute tetrahydrofuran is added dropwise to 400 mg of lithium borohydride and 30 cc of absolute tetrahydrofuran while stirring and in an atmosphere of nitrogen, and the mixture is heated to 80° for 5 hours. The mixture is subsequently decomposed with water while cooling, the undissolved material is filtered off and the filtrate is concentrated by evaporation at reduced pressure. The resulting crude title compound is recrystallized from methanol/ethyl acetate. M.P. 153°–156°.

The 2-methyl-2-[2-hydroxy-3-(4-oxindolyloxy)-propylamino]propionic acid ethyl ester, used as starting material, is produced as follows:

3 g of 4-(2,3-epoxypropoxy)oxindole, 10.4 g of α-aminoisobutyric acid ethyl ester and 40 cc of tetrahydrofuran are heated to the boil for 2 days while stirring. The hot solution is filtered and allowed to crystallize. The compound crystallizes from ether. M.P. 158°–160°.

EXAMPLE 2

4-[2-Hydroxy-3-(2-hydroxymethyl-2-propylamino)-propoxy]oxindole (process a))

5 g of 4-(2,3-epoxypropoxy)oxindole, 3.3 g of 2-amino-2-methyl-1-propanol and 50 cc of dioxane are heated to the boil at reflux for 16 hours. The reaction mixture is evaporated to dryness at reduced pressure, the residue is extracted between ethyl acetate and 1 N tartaric acid solution, the tartaric acid phases are made alkaline with 2 N caustic soda solution while cooling and extraction is effected with methylene chloride. The evaporation residue of the methylene chloride phase which has been dried over magnesium sulfate yields the title compound. M.P. 155°–158° (ethyl acetate).

In analogous manner to that described in Examples 1 and 2, the compound 7-[2-hydroxy-3-(2-hydroxymethyl-2-propylamino)propoxy]oxindole is produced.

EXAMPLE 3

4-[2-Pivaloyloxy-3-(2-pivaloyloxymethyl-2-propylamino)propoxy]oxindole (process c))

1.5 g of 4-[2-hydroxy-3-(2-hydroxymethyl-2-propylamino)propoxy]oxindole are stirred at room temperature for 2 ½ hours together with 10.4 g of pivalic acid and 2.85 g of pivalic acid anhydride. The mixture is poured on ice and is made alkaline with a 10 percent aqueous ammonia solution, extraction is effected with ethyl acetate, the extracts are dried over magnesium sulfate and the solvent is evaporated at reduced pressure. The resulting compound is converted into its hydrogen maleate, which is recrystallized from ethanol. M.P. 158°–160°.

EXAMPLE 4

4-[2-Hydroxy-3-(2-pivaloyloxymethyl-2-propylamino)propoxy]oxindole (compound A) and
4-[3-(2-hydroxymethyl-2-propylamino)-2-pivaloyloxypropoxy]oxindole (compound B) (process c))

1.5 g of 4-[2-hydroxy-3-(2-hydroxymethyl-2-propylamino)propoxy]oxindole are dissolved in 10.4 g of pivalic acid, and 0.95 g of pivalic acid anhydride are subsequently added at room temperature within 20 minutes. The reaction mixture is stirred at room temperature for 1 hour and is then worked up as described in Example 3. The resulting oily crude product consists of the compounds A and B, as well as the diester (Example 3). The separation into the individual components is effected by chromatography on 70 parts of silica gel with methylene chloride and addition of 1 to 5 percent of methanol. The resulting individual compounds are crystallized as hydrogen maleates. Compound A, hydrogen maleate: amorphous. Compound B, hydrogen maleate: M.P. 108°–111°. 4-[2-Pivaloyloxy-3-(2-pivaloyloxymethyl-2-propylamino)propoxy]oxindole (Ex. 3), hydrogen maleate: M.P. 158°–160°.

In analogous manner to that described in Examples 3 and 4, the following compounds are produced:

1-methyl-4-[2-hydroxy-3-(2-lauroyloxymethyl-2-propylamino)-propoxy]oxindole,
4-{3-[2-(cyclopropylcarbonyloxymethyl)-2-propylamino]-2-hydroxy-propoxy}oxindole,
4-[2-cyclohexylcarbonyloxy-3-(9-hydroxynonylamino)-propoxy]oxindole,
4-{2-hydroxy-3-[9-(2-thenoyloxy)-nonylamino]-propoxy}oxindole,
4-{3-[9-(2-furoyloxy)nonylamino]-2-hydroxy-propoxy}oxindole,
4-[2-hydroxy-3-(9-nicotinoyloxynonylamino)-propoxy]oxindole,
4-{2-hydroxy-3-[9-(4-tetrahydropyranylcarbonyloxy)nonylamino]-propoxy}oxindole,
4-[2-benzoyloxy-3-(2-hydroxymethyl-2-propylamino)-propoxy]oxindole,
4-[3-(2-hydroxymethyl-2-propylamino)-2-(7-phenyloenanthoyloxy)-propoxy]oxindole,
4-[3-(2-hydroxymethyl-2-propylamino)-2-phenylacetoxypropoxy]oxindole,
4-[2-cinnamoyloxy-3-(2-hydroxymethyl-2-propylamino)-propoxy]oxindole,
4-[2-(2-chlorobenzoyloxy)-3-(2-hydroxymethyl-2-propylamino)-propoxy]oxindole,
4-[2-(2-fluorobenzoyloxy)-3-(2-hydroxymethyl-2-propylamino)-propoxy]oxindole,
4-{2-[(2-bromophenyl)acetoxy]-3-(2-hydroxymethyl-2-propylamino)-propoxy}oxindole,
4-[3-(2-hydroxymethyl-2-propylamino)-2-(4-methoxycinnamoyloxy)-propoxy]oxindole and
4-{3-(2-hydroxymethyl-2-propylamino)-2-[7-(4-methylphenyl)oenanthoyloxy]-propoxy}oxindole.

What is claimed is:

1. A compound of the formula:

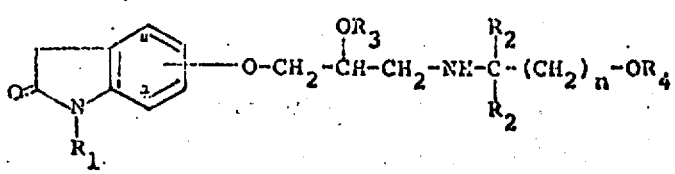

wherein the aminopropoxy side chain is in the 4 or 7 position of the oxindole structure, $R_1$ is hydrogen or alkyl of 1 to 4 carbon atoms, both groups $R_2$ are the same and are each hydrogen or alkyl of 1 to 4 carbon atoms, $n$ is an integer from 1 to 8, and $R_3$ and $R_4$, which are the same or different, are each hydrogen or the group —$COR_5$, wherein $R_5$ is alkyl of 1 to 12 carbon atoms; cycloalkyl of 3 to 6 carbon atoms; cycloalkyl of 3 to 6 carbon atoms substituted by alkyl of 1 to 4 carbon atoms; thienyl; furyl; pyridyl; or tetrahydropyranyl; phenyl; phenylalkyl of 7 to 12 carbon atoms; styryl; or phenyl, phenylalkyl of 7 to 12 carbon atoms or styryl mono substituted, on the phenyl nucleus thereof, by fluorine, chlorine, bromine, alkyl of 1 to 4 carbon atoms or alkoxy of 1 to 4 carbon atoms, in free base or pharmaceutically acceptable acid addition salt form.

2. A compound of claim 1, wherein $R_1$ is hydrogen.

3. A compound of claim 1, wherein the aminopropoxy side chain is in the 4 position of the oxindole structure.

4. A compound of claim 1, wherein n is an integer from 1 to 3.

5. A compound of claim 1, wherein the aminopropoxy side chain is in the 4 position of the oxindole structure, $R_1$ is hydrogen, both groups $R_2$ are the same and are each alkyl of 1 to 4 carbon atoms, n is the integer 1, and $R_3$ and $R_4$, which are the same or different, are each hydrogen or the group —$COR_5$, wherein $R_5$ is alkyl of 3 to 6 carbon atoms.

6. The compound of claim 5, which is
4-[2-Hydroxy-3-(2-hydroxymethyl-2-propylamino)-propoxy]oxindole.

7. The compound of claim 5, which is
4-[2-Pivaloyloxy-3-(2-pivaloyloxymethyl-2-propylamino)propoxy]oxindole.

8. The compound of claim 5, which is
4-[2-Hydroxy-3-(2-pivaloyloxymethyl-2-propylamino)propoxy]oxindole.

9. The compound of claim 5 which is
4-[3-(2-Hydroxymethyl-2-propylamino)-2-pivaloyloxypropoxy]oxindole.

* * * * *